(12) United States Patent
Agata (10) Patent No.: US 7,776,282 B2
(45) Date of Patent: Aug. 17, 2010

(54) EXHAUST GAS CLEANING APPARATUS AND RETAINING SEAL MEMBER

(75) Inventor: Masanao Agata, Ogaki (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 1141 days.

(21) Appl. No.: 11/276,756

(22) Filed: Mar. 13, 2006

(65) Prior Publication Data

US 2007/0053804 A1    Mar. 8, 2007

(30) Foreign Application Priority Data

Sep. 2, 2005    (JP)    ............................. 2005-255455

(51) Int. Cl.
*B01D 50/00* (2006.01)

(52) U.S. Cl. ..................................... 422/179

(58) Field of Classification Search ................. 422/179, 422/177, 180
See application file for complete search history.

(56) References Cited

U.S. PATENT DOCUMENTS 6,673,320 B1    1/2004    Tosa et al.

2001/0048903 A1    12/2001    Sanocki et al.
2003/0175177 A1*    9/2003    Tosa et al. .................... 422/179
2007/0081926 A1    4/2007    Okabe
2007/0160509 A1    7/2007    Saiki
2007/0212272 A1    9/2007    Okabe

FOREIGN PATENT DOCUMENTS

| EP | 1 164 267 A1 | 12/2001 |
| JP | 2002-68709 | 3/2002 |
| JP | 2002-332834 | 11/2002 |

* cited by examiner

*Primary Examiner*—Tom Duong
(74) *Attorney, Agent, or Firm*—Oblon, Spivak, McClelland, Maier & Neustadt, L.L.P.

(57) ABSTRACT

The present invention discloses a retaining seal member including a sheet material formed of an inorganic fiber. The sheet material has a protruding part on one end and a notch part on the other end. The protruding part and the notch part are engageable with each other. The protruding part includes a corner area having a rounded distal end. The notch part includes a side area having a rounded distal end.

21 Claims, 7 Drawing Sheets

EXHAUST GAS CLEANING APPARATUS AND RETAINING SEAL MEMBER

BACKGROUND OF THE INVENTION

1. Field of the Invention

The present invention generally relates to a retaining seal member used for, for example, an exhaust gas cleaning apparatus, and an exhaust gas cleaning apparatus including a retaining seal member.

2. Description of the Related Art

For the past century and continuing, the number of automobiles is dramatically rising. In proportion to this rise, the amount of exhaust gas released from internal combustion engines of the automobiles is rapidly increasing. Since various substances contained in the exhaust gas (particularly, exhaust gas of diesel engines) lead to air pollution and the like, the exhaust gas containing such substances has a serious effect on the global environment.

Under such circumstances, various exhaust gas cleaning apparatuses have been proposed and put to actual use. A typical exhaust gas cleaning apparatus has a casing (metal shell) disposed at the midstream of an exhaust pipe that is connected to an exhaust gas manifold of the engine. The casing (metal shell) has a configuration in which an exhaust gas processing member having numerous fine-sized pores is provided therein. One example of the exhaust gas processing member is an exhaust gas cleaning filter including, for example, a catalyst carrier or a Diesel Particulate Filter (DPF). For example, in a case of the DPF, the above-described configuration allows fine particles contained in the exhaust gas passing through the exhaust gas processing member to be caught by the walls surrounding the fine-sized pores. Thereby, the fine particles can be removed from the exhaust gas. The material used for forming the exhaust gas processing member includes, for example, a metal material, an alloy material, and a ceramic material. One example of an exhaust gas processing member formed of a ceramic material is a Cordierite honeycomb filter. From the aspects of, for example, thermal resistance, mechanical strength, and chemical stability, a porous silicon carbide has been recently employed as the material used for forming the exhaust gas processing member.

The exhaust gas processing member and the metal shell have a retaining seal member (typically having a cylindrical shape) interposed therebetween. The retaining seal member prevents the exhaust gas processing member from being damaged by abutting the metal shell, for example, in a situation where the automobile is running. Furthermore, the retaining seal member also prevents exhaust gas from leaking from the space between the metal shell and the exhaust gas processing member. Furthermore, the retaining seal member serves to prevent the exhaust gas processing member from being detached by the exhaust pressure of the exhaust gas. Moreover, the exhaust gas processing member is desired to have a heat insulating property for retaining a high temperature, so that reactivity can be maintained. One example of a retaining seal member that satisfies these conditions is a sheet material formed of an inorganic fiber such as an alumina fiber.

The sheet material is wrapped around an outer peripheral surface of the exhaust gas processing member except for the surface of its opening and is fixed to the exhaust gas processing member to form a united body. Thereby, the sheet material provides the functions of the exhaust gas processing member. Then, this united component is installed in the metal shell, to thereby form a part of the exhaust gas cleaning apparatus.

One method of installing the united body in the metal shell is performed by dividing the metal shell into two semi-circle shaped parts, disposing the united body into the metal shell, and joining the two semi-circle shaped parts together to form a cylindrical shaped metal shell. Another method of installing the united body in the metal shell is performed by providing C-letter shape or U-letter shape cross-section parts in the metal shell, disposing the united body into the metal shell, and closing up the cross-section parts to form a cylindrical shaped metal shell. From the aspect of improving workability and simplifying manufacturing steps, another further method of installing the united body in the metal shell is performed by preparing a cylindrical shaped metal shell and assembling the metal shell and the united body together by pressing the united body into the metal shell.

Figure 1:
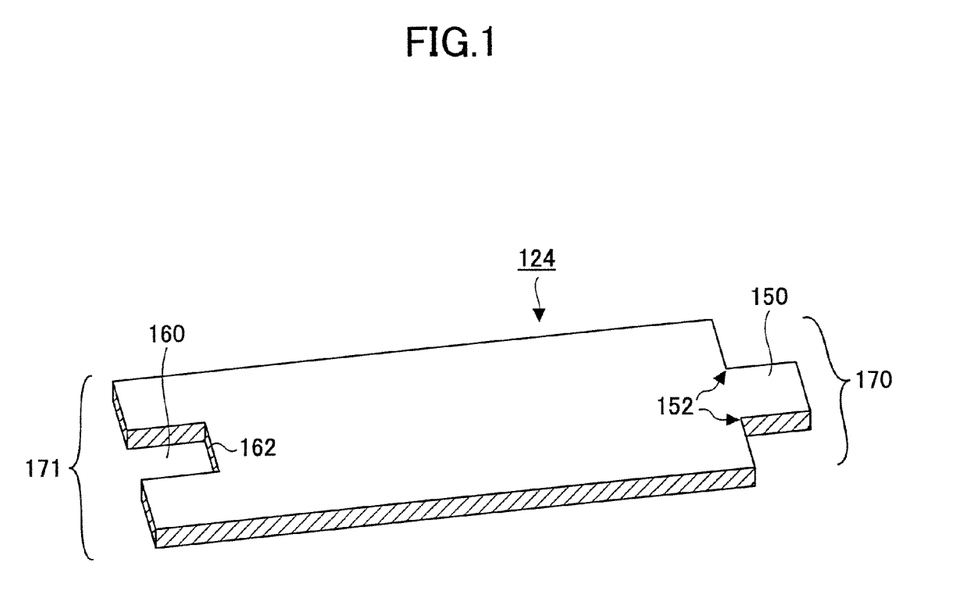
FIG. 1 is a schematic drawing showing the shape of sheet material used for a retaining seal member according to the related art.

In a conventional method of forming the retaining seal member and the exhaust gas process member into a united body by wrapping the retaining seal member around the exhaust gas process member, a sheet material 124 having the dimensions for wrapping around the exhaust gas process member is prepared and is cut into a shape having two mutually engaging end parts, in which one is a protruding part and the other is a notch part (See FIG. 1). Accordingly, the retaining seal member is fixed to the outer periphery part of the exhaust gas process member by wrapping the sheet material 124 around the outer periphery of the exhaust gas process member, fitting the protruding part into the notch part, and taping together the end parts (for example, see Japanese Laid-Open Patent Application No. 2002-68709).

SUMMARY OF THE INVENTION

The present invention may provide a retaining seal member and an exhaust gas cleaning apparatus that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a retaining seal member and an exhaust gas cleaning apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the present invention provides a retaining seal member including: a sheet material formed of an inorganic fiber; wherein the sheet material has a protruding part on one end and a notch part on the other end, the protruding part and the notch part being engageable with each other; wherein the protruding part has a corner part that is rounded at a distal end of the protruding part; wherein the notch part has a side part that is rounded at a distal end of the notch part. By cutting the sheet material into such shape, the leftover fibers remaining at the protruding part and the notch part can be reduced. Even if there are some leftover fibers remaining after cutting the sheet material, the ends of the sheet material can satisfactorily engage as originally designed since the leftover fibers can be accommodated in the spaces created in the notch part.

According to an aspect of the present invention, it is preferable that the rounded corner part and the rounded side part each have a radius of curvature "R" (mm) satisfying a relationship of approximately 0.5≦R≦P/2 in a case where "P" is the shorter one of the length "L" of the protruding part and the width "W" of the protruding part when L≠W; wherein the rounded corner part and the rounded side part each have a radius of curvature "R" (mm) satisfying a relationship of approximately 0.5≦R<P/2 in a case where "P" represents one of the length "L" of the protruding part and the width "W" of the protruding part when L=W. This prevents the loss of the engaging force at the engagement portion of the sheet material.

Furthermore, according to another aspect of the present invention, it is preferable that the retaining seal member is configured to be fixed to an exhaust gas process member by wrapping the sheet material around an outer periphery of the exhaust gas process member and engaging the ends of the sheet material.

Furthermore, according to another aspect of the present invention, it is preferable that a stem part and a base part included in the protruding part each have a radius of curvature "R" (mm) satisfying a relationship of approximately 0.5≦R≦P/2 in a case where "P" is the shorter one of the length "L" of the protruding part and the width "W" of the protruding part when L≠W; wherein the stem part and the base part included in the protruding part each have a radius of curvature "R" (mm) satisfying a relationship of approximately 0.5≦R<P/2 in a case where "P" represents one of the length "L" of the protruding part and the width "W" of the protruding part when L=W. This enables the reduction of leftover fibers at the stem part and the base part of the protruding part.

Furthermore, according to another aspect of the present invention, it is preferable that the radius of curvature "R" (mm) satisfies a relationship of approximately 0.5≦R≦P/3. This not only enables the reduction of leftover fibers at the foregoing parts of the sheet material, but also further prevents the loss of the engaging force at the engagement portion of the sheet material due to reduction of contact area.

Furthermore, according to another aspect of the present invention, it is preferable that the sheet material includes a layered sheet of an inorganic fiber subjected to a needling process. The needling process enables the fibers to be woven in the thickness direction of the sheet material, to thereby increase the density of the sheet material and reduce the thickness of the sheet material.

Furthermore, according to another aspect of the present invention, it is preferable that the sheet material contains a binder. This enables the fibers to sufficiently adhere to each other so that the fibers can be prevented from separating from each other in the process of cutting the retaining seal member or in the process of wrapping the sheet material around the exhaust gas process member and press-fitting the exhaust gas process member in the metal shell. As for the binder, an organic binder or an inorganic binder may be used. The organic binder includes, for example, an epoxy resin, an acrylic resin, a rubber based resin, and a styrene based resin. The inorganic binder includes, for example, a silica sol and an alumina sol. It is however preferable to use an organic binder since the heat of the exhaust gas during operation can dissolve (remove) the resin of the organic binder, and enable the recovering force of the retaining seal member to increase the retaining force of the retaining seal member with respect to the exhaust gas process member.

Furthermore, according to another aspect of the present invention, it is preferable that the average diameter of the inorganic fiber is approximately 6 μm or more. This enables easier cutting of the sheet material.

Furthermore, according to another aspect of the present invention, it is preferable that the inorganic fiber includes a mixture of alumina and silica. This enhances the adiathermancy of the retaining seal member.

Furthermore, according to another aspect of the present invention, it is preferable that the exhaust gas process member includes at least one of a catalyst carrier and an exhaust gas filter.

Moreover, the present invention provides an exhaust gas cleaning apparatus including: an exhaust gas process member; a retaining seal member being wrapped around the outer periphery of the exhaust gas process member, the retaining seal member including a sheet material formed of an inorganic fiber; and a shell that houses the exhaust gas process member and the retaining seal member therein; wherein the sheet material has a protruding part on one end and a notch part on the other end, the protruding part and the notch part being engageable with each other; wherein the protruding part has a corner part that is rounded at a distal end of the protruding part; wherein the notch part has a side part that is rounded at a distal end of the notch part.

Furthermore, according to another aspect of the present invention, it is preferable that the rounded corner part and the rounded side part each have a radius of curvature "R" (mm) satisfying a relationship of approximately 0.5≦R≦P/2 in a case where "P" is the shorter one of the length "L" of the protruding part and the width "W" of the protruding part when L≠W; wherein the rounded corner part and the rounded side part each have a radius of curvature "R" (mm) satisfying a relationship of approximately 0.5≦R<P/2 in a case where "P" represents one of the length "L" of the protruding part and the width "W" of the protruding part when L=W.

Furthermore, according to another aspect of the present invention, it is preferable that a stem part and a base part included in the protruding part each have a radius of curvature "R" (mm) satisfying a relationship of approximately 0.5≦R≦P/2 in a case where "P" is the shorter one of the length "L" of the protruding part and the width "W" of the protruding part when L≠W; wherein the stem part and the base part included in the protruding part each have a radius of curvature "R" (mm) satisfying a relationship of approximately 0.5≦R<P/2 in a case where "P" represents one of the length "L" of the protruding part and the width "W" of the protruding part when L=W.

Furthermore, according to another aspect of the present invention, it is preferable that the radius of curvature "R" (mm) satisfies a relationship of approximately 0.5≦R≦P/3.

In the exhaust gas cleaning apparatus according to an embodiment of the present invention, the characteristics of the foregoing retaining seal member allow each component in of the exhaust gas cleaning apparatus to satisfactory maintain their position even after the united body comprising the retaining seal member and the exhaust gas process member is press-fitted in the metal shell.

Here, the sheet material included in the retaining seal member of the exhaust gas cleaning apparatus may include each of the foregoing characteristics. Furthermore, the exhaust gas process member may include at least one of a catalyst carrier and an exhaust gas filter. This allows the exhaust gas cleaning apparatus to attain a satisfactory gas sealing property and a sufficient retaining property with respect to the catalyst carrier and the exhaust gas filter.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

The retainer seal member 15 according to an embodiment of the present invention includes a sheet material 24 formed of an inorganic fiber. The retainer seal member 15 is used, for example, by having the sheet material 24 wrapped around the outer periphery of the exhaust gas process member 20.

Figure 2:
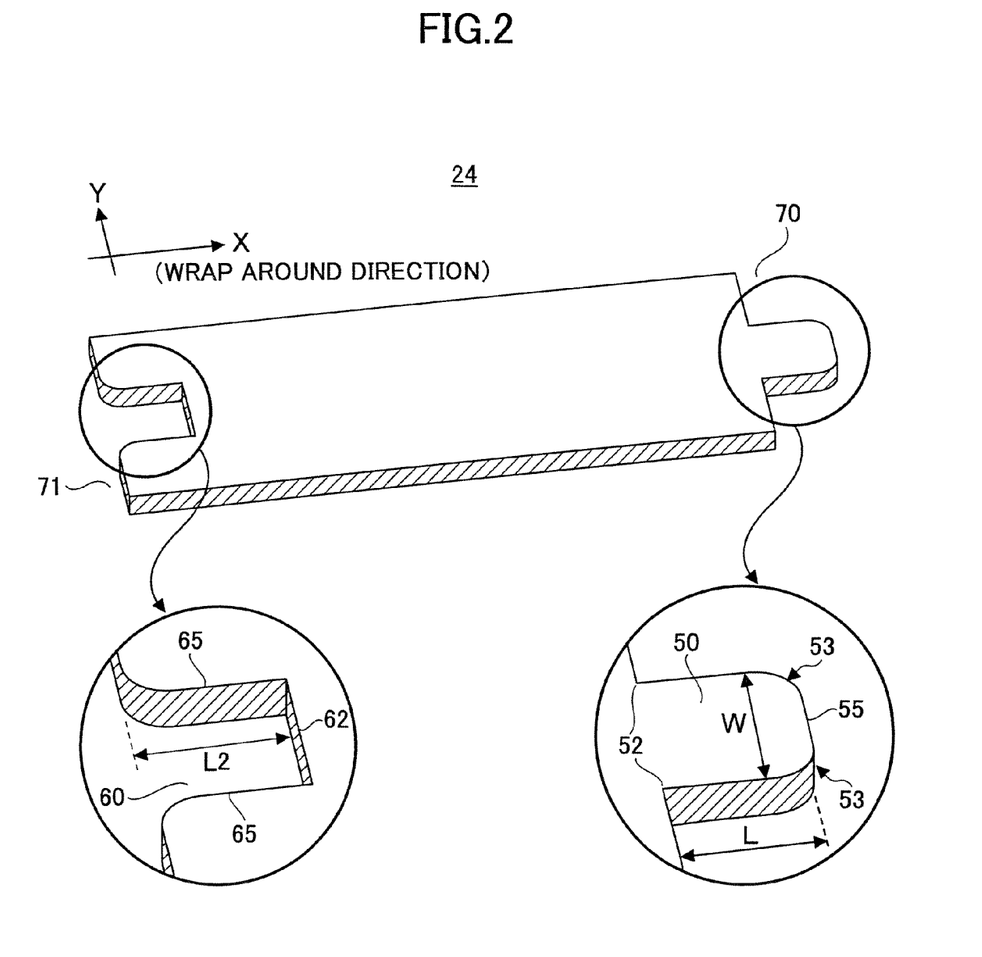
FIG. 2 is a schematic drawing showing the shape of sheet material used for a retaining seal member and its end parts according to an embodiment of the present invention.

FIG. 2 shows an example of the shape of the sheet material 24 used for the retainer seal member 15 according to an embodiment of the present invention. Enlarged views of the end parts 70, 71 of the sheet material 24 are shown in FIG. 2. The end parts 70, 71 engage with each other when the sheet material 24 is wrapped around the exhaust gas process member 20. One end part 70 includes at least one protruding part 50 and the other end part 71 includes at least one notch part 60 into which the protruding part 50 is fitted.

A corner part 53, which is provided at the distal end of the protruding part 50 of the sheet material 24, is rounded. Furthermore, the distal end of the side part 65 of the notch part 60 is also rounded. By cutting the end parts 70, 71 of the sheet material 24 into the curved shape, the protruding part 50 can be fitted in the notch part 60 without any unevenness, thereby allowing both end parts to snugly engage each other. This owes to the fact that (1) there will be few insufficiently cut leftover fibers remaining at the protruding part 50 and the notch part 60 (since cutting the sheet material 24 is made easier by rounding the corner part 53 and the distal end of the side part 65), and also to the fact that (2) even in a case where insufficiently cut leftover fibers remain, for example, at the corners of the base 62 of the notch part 60 or at the stem 52 of the protruding part 50, the leftover fibers can be accommodated in the spaces provided by rounding the corner part 53 and the distal end of the side part 65. Accordingly, subsequent to the cutting of the sheet material 24, the sheet material 24 serving as the retainer seal member 15 is wrapped around the outer periphery of the exhaust gas process member 20 to form a cylindrical shape and the end parts 70, 71 are engaged and fixed. Thereby, no undesired problems owing to leftover fibers (e.g. unevenness, loosening, detachment) occurs when engaging and fixing the end parts 70, 71 of the sheet material 24 (retainer seal member 15). Furthermore, there is no need for a person to manually remove leftover fibers from the sheet material 24 prior to wrapping the sheet material 24 around the exhaust gas process member 20 and engaging/fixing the end parts 70, 71. Furthermore, the united body formed of the retainer seal member 15 and the exhaust gas process member 20 can be easily pressed into the metal shell 12 since the retainer seal member 15 is in a sufficiently engaged state. Thus, after the united body is pressed into the metal shell 12, each component including the retainer seal member 15 and the exhaust gas process member 20 can maintain a position as originally designed. Thereby, an exhaust gas cleaning apparatus 10, which sufficiently retains the exhaust gas process member 20 therein, can be obtained.

It is preferable to cut the above-described parts (the corner parts 53 at the distal end of the protruding part 50 and the distal ends of the side parts 65 of the notch part 60) of the sheet material 24 so that the radius of curvature "R" (mm) of the sheet material 24 satisfies a relationship of approximately $0.5 \leq R \leq P/2$, wherein "P" is the shorter one of the length of the protrusion of the protruding part 50 (indicated as "L") and the width of the protrusion of the protruding part 50 (indicated as "W"). Furthermore, the foregoing advantages can be attained more significantly by cutting the above-described parts of the sheet material 24 so that the radius of curvature "R" of the sheet material 24 satisfies a relationship of approximately $R \geq 0.5$ in a case where the sheet material 24 is used as the retaining seal member 15. The reason for setting the radius of curvature "R" to approximately $R \leq P/2$ is because the protruding part 50 and the notch part 60 contact each other at a predetermined area when the sheet material 24 is wrapped around the outer periphery of the exhaust gas process member 20 and the end parts 70, 71 are engaged and fixed together by tape. In other words, in a case where the radius of curvature "R" is approximately R>P/2, the protruding part 50 and the notch part 60 do not substantially contact each other and are unable to generate an engaging force. Furthermore, the sealing property is significantly reduced since gas is able to pass through the space created at the engagement portion. On the other hand, in a case where the radius of curvature "R" is approximately $R \leq P/2$, a certain amount of engaging force is generated at the engagement portion, to thereby increase the retaining force of the retaining seal member 15. Furthermore, no passage through which gas can flow is created at the engagement portion between the protruding part 50 and the notch part 60. Accordingly, a satisfactory sealing property can be maintained.

Figure 4:
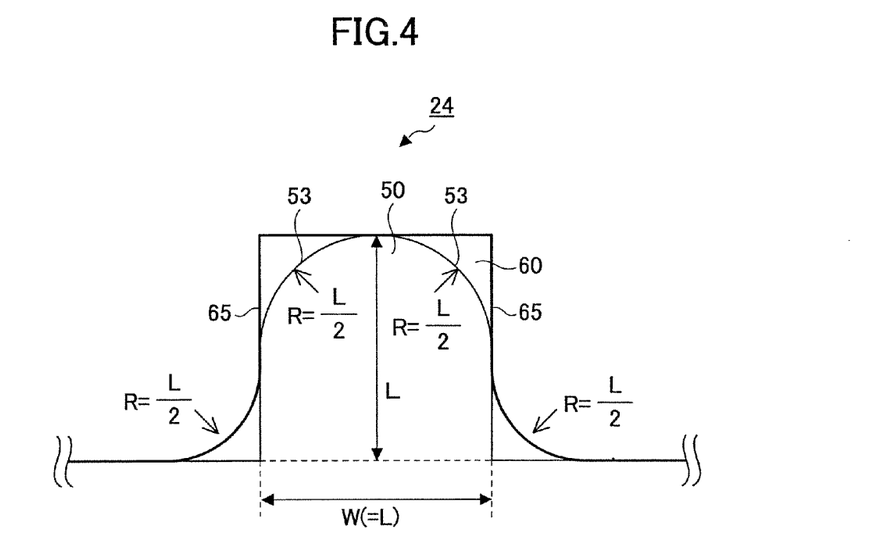
FIG. 4 is a schematic drawing showing an engaged state of a protruding part 50 and a notch part 60 of a sheet material in a case where the protruding length L and the protruding width W of the protruding part 50 of the sheet material are equal when the radius of curvature R at respective distal ends of a corner part 53 of the protruding part 50 and a side part 65 of the notch part 60 satisfies P/2 (i.e. R=L/2=W/2) according to an embodiment of the present invention.

In a case where the protruding part 50 of the sheet material 24 has a shape in which the length of the protrusion is equal to the width of the protrusion (L=W), the radius of curvature "R" is to satisfy a relationship of approximately $0.5 \leq R < P/2$. Here, "P" represents one of the length "L" of the protruding part and the width "W" of the protruding part. In this case, the radius of curvature R (mm) being approximately equal to P/2 means that the engagement portion between the protruding part 50 and the notch part 60 has a shape as shown in FIG. 4. Therefore, when the protruding part 50 has such a shape, the protruding part 50 and the notch part 60 do not substantially contact plane to plane (i.e. the protruding part 50 and the notch part 60 contact at points when R is approximately equal to P/2). Accordingly, no engaging force is generated at the engagement portion. Furthermore, gas can leak through the space created at the engagement portion of the sheet material 24. Hence, in the case where the protruding part 50 has such a shape, the sheet material 24 is to be cut so that the radius of curvature of the above-described parts satisfies the relationship of approximately $0.5 \leq R < P/2$.

Moreover, it is further preferable to cut the sheet material 24 so that the radius of curvature of the above-described parts satisfies the relationship of approximately $0.5 \leq R \leq P/3$. By using the sheet material 24 of such configuration as the retaining seal member 15, a sufficient contact area can be ensured between the protruding part 50 and the notch part 60 and a greater engaging force can be obtained.

Figure 5:
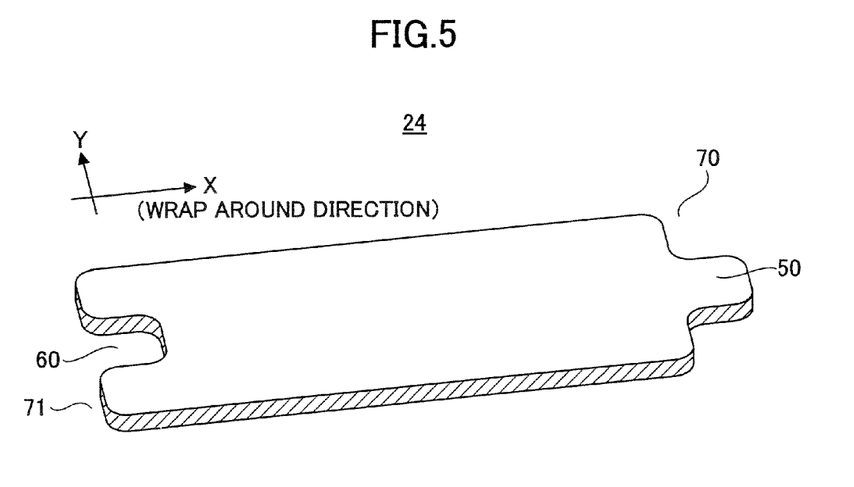
FIG. 5 is a schematic drawing showing the shape of another sheet material used as a retaining seal member according to an embodiment of the present invention.

The above-described example describes a case where only the corner parts 53 at the distal end of the protruding part 50 and the distal ends of the side parts 65 of the notch part 60 are rounded. It is, however, to be noted that other parts of the sheet material 24 may also be rounded according to necessity. For example, as shown in FIG. 5, the corners of the base 62 of the notch part 60 and the stem 52 of the protruding part 50 may be rounded so that the radius of curvature R at the corners of the base 62 of the notch part 60 and at the stem 52 of the protruding part 50 satisfy a relationship of approximately $0.5 \leq R \leq P/2$ (however, approximately $0.5 \leq R < P/2$ when L=W). The leftover fibers that remain after the cutting of the sheet material 24 can be further reduced.

Figure 6:
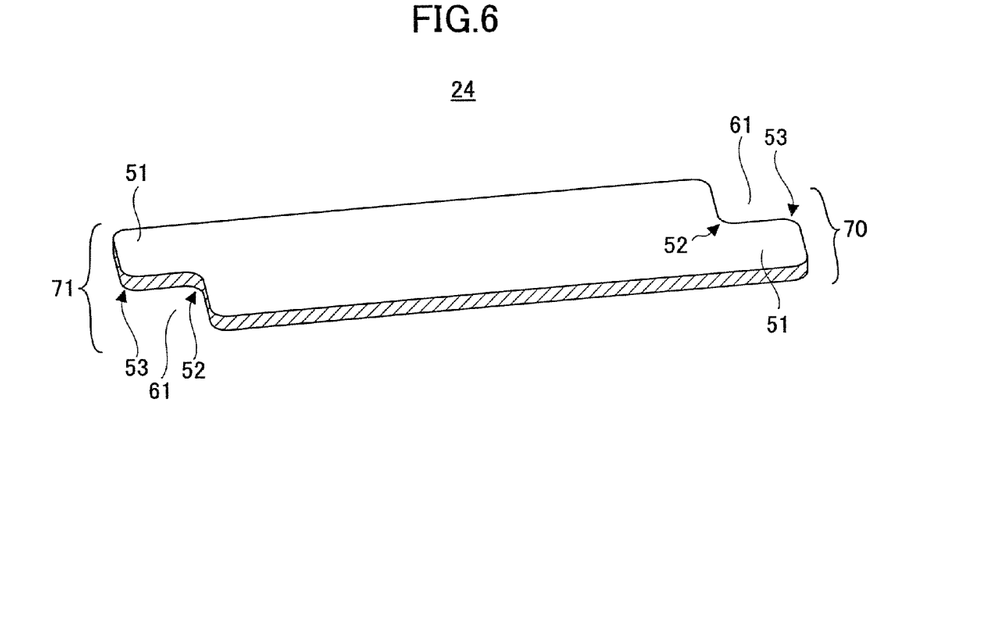
FIG. 6 is a schematic drawing showing the shape of yet another sheet material used as a retaining seal member according to an embodiment of the present invention.

In the examples shown in FIGS. 2 and 5, the engagement portion of the end parts 70, 71 of the sheet material 24 are formed by a pair of the protruding part 50 and the notch part 60. However, the configuration of the end parts 70, 71 of the sheet material 24 is not limited to those shown in FIGS. 2 and 5. For example, the engagement portion may be formed by plural pairs of the protruding part 50 and the notch part 60. In another example, as shown in FIG. 6, the engagement portion may be formed by one pair of protruding parts 51 and one pair of notch parts 61, in which the end parts 70, 71 are matched and fixed to each other by, for example, tape. In this case, the above-described advantages can be attained by having at least one of the corner parts 53 (which abuts the base 52 of an opposite end part 70, 71) to satisfy the above-described relationship.

Figure 3:
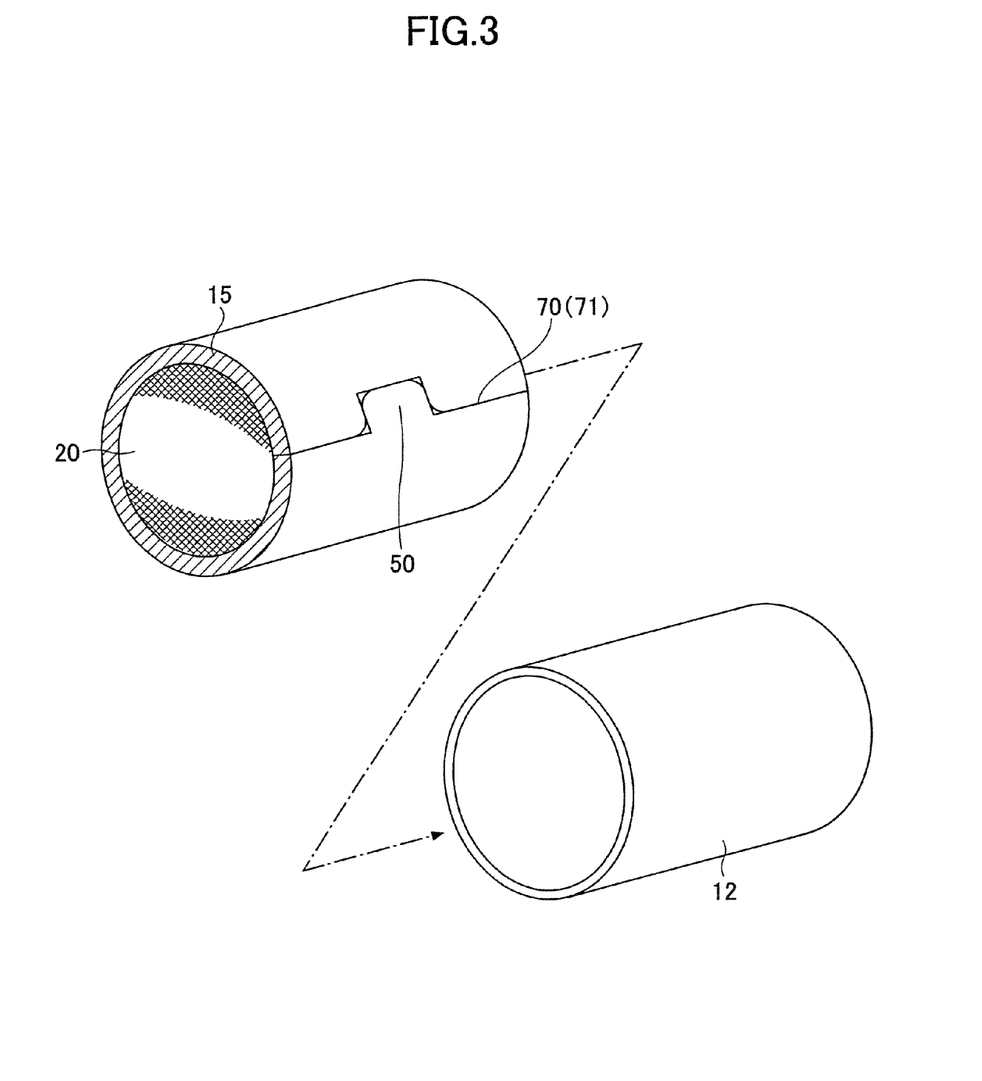
FIG. 3 is a schematic drawing for describing an exhaust gas cleaning apparatus formed by wrapping a retaining seal member 24 around an exhaust gas process member 20, fixing the retaining seal member 24 and the exhaust gas process member 20 together, and pressing the retaining seal member 24 and the exhaust gas process member 20 into a metal shell 12 according to an embodiment of the present invention.
Figure 7:
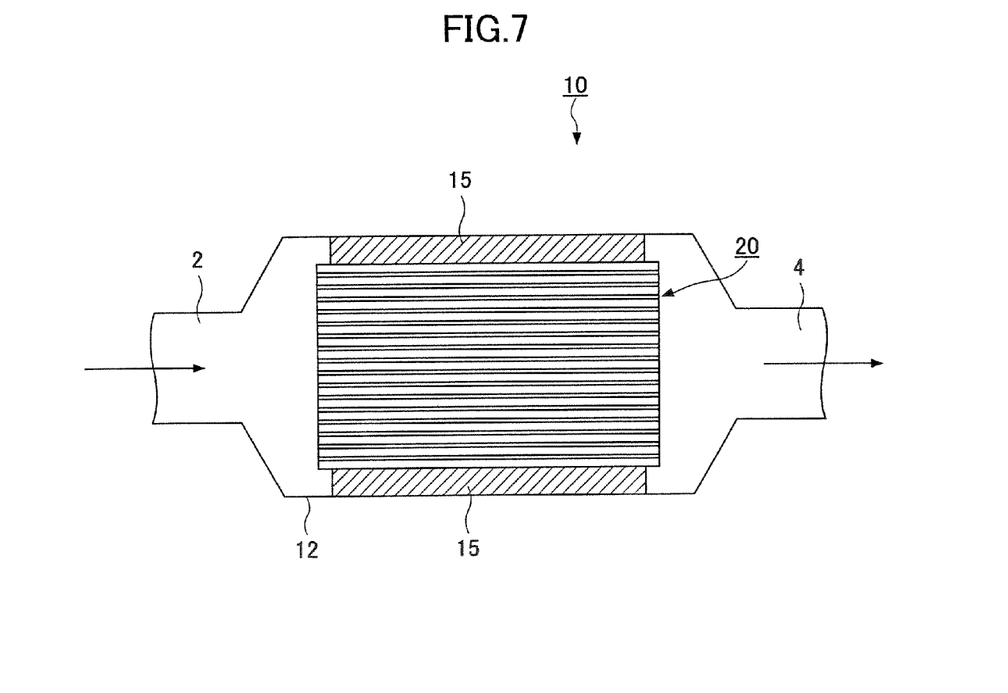
FIG. 7 is a schematic drawing showing an exemplary configuration of an exhaust gas cleaning apparatus according to an embodiment of the present invention.

As shown in FIG. 3, the above-described retaining seal member 15 is wrapped around the outer periphery of the exhaust gas process member 20 and fixed thereto to form a united body. This united body of the retaining seal member 15 and the exhaust gas process member 20 is disposed inside the metal shell 12 by using, for example, a press-fitting method. FIG. 7 shows an exemplary configuration of the exhaust gas cleaning apparatus 10 including the united body disposed inside the metal shell 12. In the example shown in FIG. 7, the exhaust gas process member 20 is a catalyst carrier having numerous through-holes arranged in a direction parallel to the flow of gas (indicated with arrows in FIG. 7). The catalyst carrier includes, for example, a porous silicon carbide having a honeycomb configuration. It is, however, to be noted that the exhaust gas cleaning apparatus 10 including the exhaust gas process member 20 is not limited to the foregoing configuration. For example, the exhaust gas process member 20 may have a portion of its through-holes formed as a meshed Diesel Particulate Filter (DPF). By applying the retaining seal member 15 to the exhaust gas cleaning apparatus 10, each of the components including the retainer seal member 15 and the exhaust gas process member 20 can maintain their predetermined positions even after they are press-fitted into the metal shell 12. Accordingly, the exhaust gas cleaning apparatus 10 can attain a satisfactory gas sealing performance. Furthermore, the exhaust gas cleaning apparatus 10 can sufficiently retain the exhaust gas process member 20 without having the exhaust gas process member 20 disengaged by the pressure of the exhaust gas.

Next, an exemplary method of fabricating the retaining seal member 15 according to an embodiment of the present invention is described.

The retaining seal member 15 is formed of a sheet material 24. The sheet material 24 is fabricated as described below.

First, a layered sheet formed of an inorganic fiber is produced. In the following example, a mixture of alumina and silica is employed as the inorganic fiber. It is, however, to be noted that other material(s) may also be employed as the inorganic fiber. For example, an alumina fiber or a silica fiber may solely be used as the inorganic fiber. A precursor of an inorganic fiber is prepared by adding a silica sol to an aqueous solution of basic aluminum chloride containing aluminum of approximately 70 g/l, Al/Cl=approximately 1.8 (atom ratio) so that the composition ratio between alumina and silica is approximately 60-80:40-20. It is more preferable for the composition ratio between alumina and silica to be approximately 70-74:30-26. In a case where the alumina composition ratio is 60% or less, the composition ratio of the mullite generated by the alumina and the silica becomes low. This leads to an increase in thermal conductivity and an insufficient adiathermancy.

Next, an organic polymer (e.g. polyvinyl alcohol) is added to the precursor of the alumina based fiber. Then, a spinning solution is prepared by concentrating this liquid. Then, by using this spinning solution, fiber spinning is performed with a blowing method. The blowing method is a method in which fiber is spun by the flow of air blown out from an air nozzle and the flow of spinning solution discharged from a spinning solution supply nozzle. Normally, the gas flow speed per slit of the air nozzle is approximately 40-200 m/s. Normally, the diameter of the spinning solution supply nozzle is approximately 0.1-0.5 mm, and the liquid flow rate of a single spinning solution supply nozzle is approximately 120 ml/h (more preferably, approximately 3-50 ml/h). Under these conditions, the spinning solution discharged from the spinning solution supply nozzle can be sufficiently drawn without becoming a spray (mist) and fibers can be prevented from adhering to each other. Accordingly, by optimizing the spinning conditions, a uniform alumina fiber precursor in which the diameter of the fibers vary little.

Here, it is preferable for the average fiber length of the fabricated alumina based fiber to be approximately 250 μm or more, and more preferably to be approximately 500 μm or more. In a case where the average fiber length is approximately 250 μm or more, the fibers can attain a sufficient strength without tangling with each other. The average diameter of the inorganic fiber is not limited to a particular length. It is to be noted that the above-described advantages can be attained even where the average diameter of the inorganic fibers is approximately 6 μm or more.

After the spinning process is performed on the precursors, the precursors are layered to form a layered sheet. Then, a needling process is performed on the layered sheet. The needling process is a process in which the sheet is made thin by driving needles in and out of the layered sheet. Normally, a needling apparatus includes a needle board being reciprocally movable in the needle driving direction and a pair of support plates being disposed one on each side of the layered sheet, respectively. Multiple needles, which are to be driven into the layered sheet, are fixed to the needle board, in which the needles are disposed, for example, in a density of approximately 100-5000 needles/100 cm². Through-holes corresponding to the needles are provided to the support plates. With this needling apparatus, the needling process of driving needles in and out of the layered sheet is performed. Thereby, extensively entangled fibers can be oriented in the layer direction, and thus the layered sheet can be strengthened in the layer direction.

The layered sheet after being subjected to the needling process (hereinafter referred to as "sheet material") is heated beginning from room temperature and is continuously baked to a maximum temperature of approximately 1250° C. Thereby, a sheet material having a predetermined weight (density) can be obtained.

The obtained sheet material is cut into a predetermined sized for simplifying the handling of the sheet material.

Then, after the sheet material is cut into a predetermined size, it is preferred to impregnate the sheet material with an organic type binder such as resin. This restrains the subliming of the sheet material 24 and improves the assembling property when using the sheet material 24 as the retaining seal member 15 of the exhaust gas process member 20 of the exhaust gas cleaning apparatus 10. Furthermore, this prevents the inorganic fibers from separating from the sheet material 24 and the retaining force from weakening. Furthermore, since the organic binder of the retaining seal member 15 dissolves when high temperature exhaust gas is guided into the exhaust gas cleaning apparatus 10, the retaining seal member 15 recovers from being compressed so that the spaces which may exist between the metal shell 12 and the exhaust gas process member 20 can be covered. Accordingly, the retaining force and the sealing property of the retaining seal member 15 can be improved.

It is preferable that the amount of the contained organic binder to range from approximately 1.0 to 10.0% by weight. In a case where the amount is 1.0% or more by weight, the inorganic fibers can be sufficiently prevented from separating from the sheet material 24. In a case where the amount is 10.0 or less by weight, flexibility can be attained for the sheet material 24. Thereby, the sheet material 24 can be easily wrapped around the exhaust gas process member 20.

It is preferable to use, for example, an acrylic rubber (ACM), an acrylonitrile butadiene rubber (NBR), or a styrene butadiene rubber (SBR) resin as the organic based binder.

A dispersing liquid having the organic based binder and water adjusted therein is spray-coated to the sheet material 24, to thereby impregnate the sheet material 24 with resin. It is to be noted that excess attached solid contents and liquids contained in the sheet material 24 are removed in a subsequent process.

Next, a process of removing excess solid contents and liquids is performed on the sheet material 24. The excess solid contents are removed by employing a suction method. Furthermore, the excess liquids are removed by employing a thermal compression drying method. Since pressure is applied to the sheet material 24, not only can excess liquid be removed from the sheet material 24, but the sheet material 24 can have its thickness reduced. The drying process is performed in a temperature of approximately 95 to 155° C. When the temperature is approximately 95° C. or more, the drying time can be reduced and productivity can be increased. When the temperature is approximately 155° C. or less, the organic based binder is prevented from decomposing and the adhering property of the organic binder is prevented from degrading.

Finally, the sheet material 24 is cut into a predetermined shape. As described above, the sheet material 24 having little leftover fibers remaining in the engagement portion can be obtained by cutting the sheet material 24 so that the predetermined parts of the protruding part 50 and the notch part 60 are rounded.

Accordingly, the obtained sheet material is used as the retaining seal member 15 of the exhaust gas process member 20 of the exhaust gas cleaning apparatus 10. That is, a united body of the retaining seal member 15 and the exhaust gas process member 20 is obtained by wrapping the sheet material 24 around the exhaust gas process member 20 and fixing the end parts by engaging the protruding part 50 and the notch part 60. Then, this united body is provided (e.g. press-fit) inside the metal shell 12 formed of stainless steel, for example. Thereby, the exhaust gas cleaning apparatus 10 is obtained.

Next, the advantages of the present invention are described with embodiments of the present invention.

Embodiments

The sheet material 24 is fabricated according to the following steps.

[Sheet Material Fabrication Step]

A precursor of an alumina based fiber is formed by adding a silica sol to an aqueous solution of basic aluminum chloride containing aluminum of approximately 70 g/l, Al/Cl=1.8 (atom ratio) so that the composition ratio of the alumina based fiber satisfies a relationship of $Al_2O_3:SiO_2=72:28$.

An organic polymer (e.g. polyvinyl alcohol) is added to the alumina based fiber. Furthermore, a spinning solution is prepared by concentrating this liquid. Then, by using this spinning solution, fiber spinning is performed with a blowing method.

Then, the precursor of the alumina based fiber is folded and layered, to thereby fabricate a layered sheet of the alumina based fiber. Then, a needling process is performed on the layered sheet by using a needling jig having 500 needles/100 cm². Then, the sheet material 24 obtained from the needling process is subjected to a consecutive baking process from room temperature to a maximum temperature of 1250° C. Thereby, the sheet material 24 of an alumina based fiber having a weight (density) of 1160 g/cm² is obtained. The average diameter of the alumina based fiber is 7.2 μm, and the smallest diameter is 3.2 μm. Furthermore, the thickness of the sheet material 24 is 9 mm.

The average diameter of the fiber is measured according to the following method. First, samples of the alumina based fiber are placed in a cylinder and are crushed with a pressing force of 20.6 MPa. Then, the sample is placed on a sieve and the sample(s) that pass through the meshes of the sieve become the samples for electron microscope observation. After gold or the like is evaporated onto the surfaces of the samples, electron microscopic photographs are taken with a magnification of approximately 1500 times. The diameters of at least 40 fibers are measured from the obtained photographs.

This process is repeated with respect to five samples. The average of the measured results is considered as the average diameter of the fibers.

[Sheet Material Cutting Step]

The fabricated sheet material 24 is cut to a size so that its length is 1270 mm and its width is 1280 mm.

[Organic Binder Impregnation Step]

The sheet material 24, which is cut to the predetermined size, is impregnated with an organic binder. The impregnating liquid is obtained by preparing a dispersing liquid of an acrylic resin in water (manufactured by Zeon Corporation L×803, concentration of solid contents 50±10%, pH 5.5~7.0) so that the concentration of resin ranges from 1.0 to 10.0% by weight. Then, sheet material 24 is impregnated with the impregnating liquid by being spray-coated with the impregnating liquid.

[Solid Content Suction Step]

Excess solid contents exceeding a predetermined amount adhere to the sheet material 24 after the sheet material 24 is impregnated with the organic binder. Accordingly, a suction process is performed on the sheet material 24 (for approximately three seconds) for removing the excess solid contents. After the suction process, the impregnation rate of the organic binder in the sheet material 24 is evaluated by using a weighing method. As a result, the impregnation rate of the organic binder in the sheet material 24 is 10 wt %.

[Thermal Compression/Drying Step]

Following the suction process, a thermal compression/drying step is performed on the sheet material 24 with a drying temperature ranging from 95 to 155° C. The sheet material 24 is subjected to the thermal compression/drying process while being sandwiched by a jig. After the thermal compression/drying process, a sheet material 24 having an average thickness of approximately 8 mm is obtained.

[Punch Cutting Step]

The obtained sheet material 24 is press-cut into the shape shown in FIG. 5. The sheet material 24 has a maximum length of 230 mm in the wrapping direction (X direction) and a width of 80 mm (length in the Y direction). Furthermore, in the sheet material 24, the protruding part 50 has a protruding length L of 30 mm and a protruding width W of 15 mm, and the notch part 60 has a depth of 31 mm and a width of 15 mm. In this example, the above-described P=(W=) 15 mm. The radius of curvature of the corner part 53 of the protruding part 50, the stem part 52 of the protruding part 50, the distal end of the side part 65 of the notch part 60, and the corner of the base 62 of the notch part 60 (hereinafter also referred to as radius (radii) of curvature of each part) satisfy a relationship of R=3 mm (Embodiment 1).

In the same manner, the sheet materials 24 of Embodiments 2-4, 6-9, and Comparative example 1 are fabricated. These sheet materials 24 are basically fabricated by performing the same processes as Embodiment 1. However, the radii of curvature of the parts in these sheet materials 24 are varied between of range of R=0.4-7.5 mm. Although Embodiment 5 uses a sheet material 24 having substantially the same specifications as the sheet material 24 of Embodiment 4, they are different in that the inorganic fiber of the sheet material of Embodiment 5 has a diameter of 5.7 μm. Table 1 shows, for example, the radius (radii) of curvature of each part R of the sheet material 24 and the magnification of P (protruding width W of the protruding part 50) with respect to the radius of curvature R for each embodiment of the present invention and a comparative example. It is to be noted that in the following Tables 1-3, "⊚" indicates that the removal force is excellent, "○" indicates that the removal force is good, and "X" indicates that the removal force is poor.

TABLE 1

| | Fiber Diameter (μm) | Radius of Curvature R (mm) | Magnification with respect to P (P = W = 15 mm) | Removal Force (N) | Grade |
|---|---|---|---|---|---|
| Embodiment 1 | 7.2 | 3 | 1/5 | 405 | ⊚ |
| Embodiment 2 | 7.2 | 2 | 2/15 | 372 | ⊚ |
| Embodiment 3 | 7.2 | 5 | 1/3 | 348 | ⊚ |
| Embodiment 4 | 7.2 | 1 | 1/15 | 324 | ⊚ |
| Embodiment 5 | 5.7 | 1 | 1/15 | 337 | ⊚ |
| Embodiment 6 | 7.2 | 6 | 2/5 | 268 | ○ |
| Embodiment 7 | 7.2 | 7.5 | 1/2 | 232 | ○ |
| Embodiment 8 | 7.2 | 0.9 | 3/50 | 281 | ○ |
| Embodiment 9 | 7.2 | 0.5 | 1/30 | 225 | ○ |
| Comparative Example 1 | 7.2 | 0.4 | 2/75 | 186 | X |

[Protruding Length L=30 mm, Protruding Width W=15 mm]

Next, in the same manner, the sheet materials 24 of Embodiments 11-19 and Comparative example 11 are fabricated. However, in the foregoing embodiments and comparative example, the protruding length L of the protruding part 50 is 15 mm, the width W of the protruding part 50 is 30 mm, the depth of the notch part 60 is 16 mm, and the width of the notch part 60 is 30 mm. Table 2 shows, for example, the radius of curvature of each part R of the sheet material 24 and the magnification of P (protruding length L of the protruding part 50) with respect to the radius of curvature R for Embodiments 11-19 and Comparative Example 11.

TABLE 2

| | Fiber Diameter (μm) | Radius of Curvature R (mm) | Magnification with respect to P (P = W = 15 mm) | Removal Force (N) | Grade |
|---|---|---|---|---|---|
| Embodiment 11 | 7.2 | 3 | 1/5 | 365 | ⊚ |
| Embodiment 12 | 7.2 | 2 | 2/15 | 342 | ⊚ |
| Embodiment 13 | 7.2 | 5 | 1/3 | 318 | ⊚ |
| Embodiment 14 | 7.2 | 1 | 1/15 | 302 | ⊚ |
| Embodiment 15 | 5.7 | 1 | 1/15 | 310 | ⊚ |
| Embodiment 16 | 7.2 | 6 | 2/5 | 243 | ○ |
| Embodiment 17 | 7.2 | 7.5 | 1/2 | 207 | ○ |
| Embodiment 18 | 7.2 | 0.9 | 3/50 | 255 | ○ |
| Embodiment 19 | 7.2 | 0.5 | 1/30 | 201 | ○ |
| Comparative Example 11 | 7.2 | 0.4 | 2/75 | 176 | X |

[Protruding Length L=15 mm, Protruding Width W=30 mm]

Next, in the same manner, the sheet materials 24 of Embodiments 21-28 and Comparative example 21, 22 are fabricated. However, in the foregoing embodiments and comparative examples, the protruding length L and the width W of the protruding part 50 are both 30 mm, the depth of the notch part 60 is 31 mm, and the width of the notch part 60 is 30 mm. Furthermore, the radii of curvature of the parts in these sheet materials 24 are varied between of range of R=0.4-15 mm.

Table 3 shows, for example, the radius of curvature of each part R of the sheet material 24 and the magnification of P (protruding length L or protruding width W of the protruding part 50) with respect to the radius of curvature R for Embodiments 21-22 and Comparative Examples 21 and 22.

TABLE 3

| | Fiber Diameter (μm) | Radius of Curvature R (mm) | Magnification with respect to P (P = W = 15 mm) | Removal Force (N) | Grade |
|---|---|---|---|---|---|
| Embodiment 21 | 7.2 | 3 | 1/10 | 371 | ◎ |
| Embodiment 22 | 7.2 | 2 | 1/15 | 352 | ◎ |
| Embodiment 23 | 7.2 | 9 | 3/10 | 319 | ◎ |
| Embodiment 24 | 7.2 | 1 | 1/30 | 305 | ◎ |
| Embodiment 25 | 5.7 | 1 | 1/30 | 317 | ◎ |
| Embodiment 26 | 7.2 | 11 | 11/30 | 245 | ○ |
| Embodiment 27 | 7.2 | 0.9 | 3/100 | 265 | ○ |
| Embodiment 28 | 7.2 | 0.5 | 1/60 | 205 | ○ |
| Comparative Example 21 | 7.2 | 15 | 1/2 | 192 | X |
| Comparative Example 22 | 7.2 | 0.4 | 1/75 | 180 | X |

[Protruding Length L=30 mm, Protruding Width W=30 mm]

[Removal Force Test]

Figure 8:
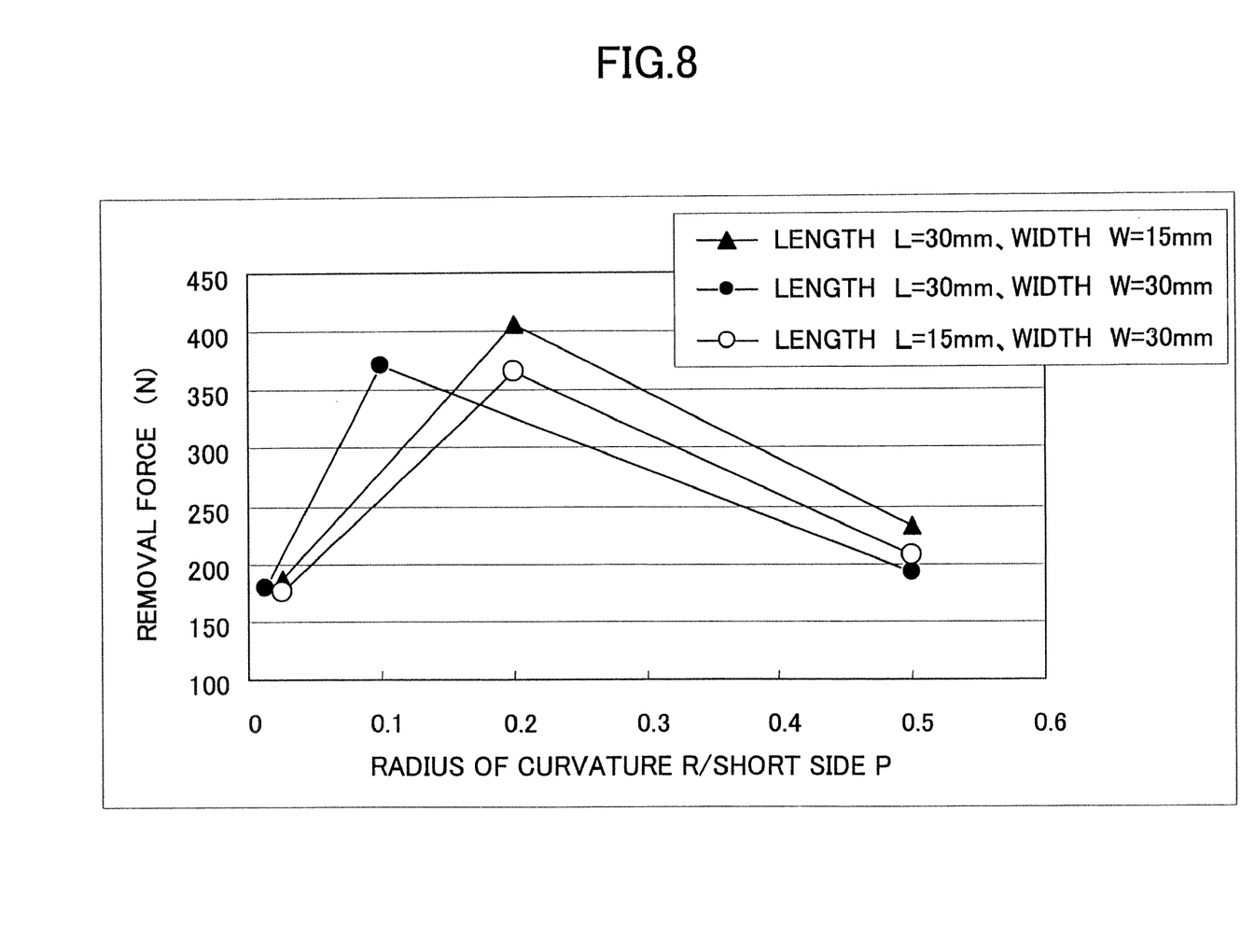
FIG. 8 is a graph showing the relationship of the respective radius of curvature R and the removal force of the protruding part 50 and the notch part 60 of the sheet material.

Each sheet material 24 of Embodiments 1-28, Comparative Examples 1, 11, 21, 22 is formed into a united body with a catalyst carrier by wrapping each sheet material around the outer periphery of the catalyst carrier (having a diameter of 80 mm and a length of 150 mm), engaging the protruding part 50 and the notch part 60, and taping the engaged end parts together. Then, a sample is fabricated by pressing-fitting the united body into a cylindrical metal shell formed of SUS 304 metal (having an inner diameter of 84 mm, a thickness of 1.5 mm, and a length of 200 mm). After the sample is retain in such state for 24 hours or more, a removal force test is performed on the sample by using a universal testing machine. Here, "removal force" refers to the maximum load necessary for pressing the press-fitted catalyst carrier out from the metal shell. Test results show that the retaining force of the retaining seal member with respect to the exhaust gas process member is sufficient for practical use when the removal force exceeds 200 N. The measurement results are shown in Tables 1-3 and FIG. 8. From these results, it is found that, when the radius of curvature R of each part of the sheet material 24 satisfies a relationship of $0.5 \leq R \leq P/2$ (however, $0.5 \leq R < P/2$ when L=W), the removal force of the sample surpasses 200 N and the retaining seal member 15 attains sufficient retaining force. Particularly, when the radius of curvature R of each part of the sheet material 24 satisfies a relationship of $0.5 \leq R \leq P/3$, the removal force of the sample surpasses 300 N and the retaining seal member 15 using such sheet material 24 attains a highly satisfactory retaining force.

Figure 9:
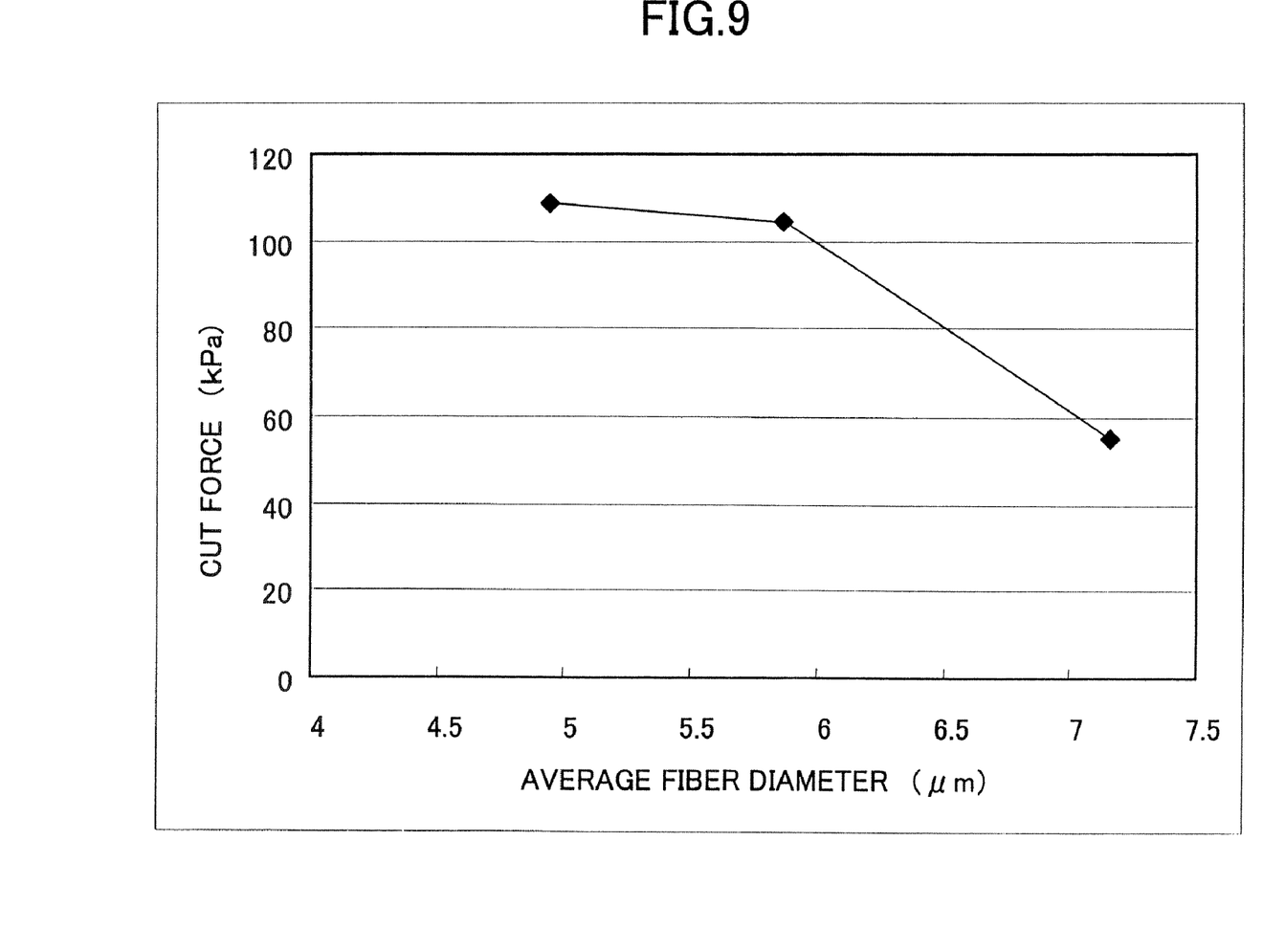
FIG. 9 is a graph showing the relationship of the average fiber diameter and the cutting force of the sheet material.

FIG. 9 shows the relationship of the average fiber diameter of the sheet material 24 and the cut force of the sheet material 24 that is obtained by performing a cutting test on the sheet material 24. The cutting test measures the load required for cutting a 50 mm×50 mm sheet material 24 which is fabricated by the above-described processes with use of a cutting jig. The maximum cut force obtained by the tests is plotted as the cut force. From the test results, it is found that the cut force becomes lower and the sheet material 24 becomes easier to cut as the average fiber diameter of the sheet material 24 becomes greater. It is assumed that the probability of the existence of defects in the sheet material 24 becomes higher as the fiber diameter becomes thicker. Hence, a significant effect can be attained with the present invention when a sheet material 24 having an average fiber diameter exceeding 6 μm is used.

The retaining seal member and the exhaust gas cleaning apparatus according to an embodiment of the present invention may be applied to, for example, an exhaust gas cleaning apparatus for a vehicle.

Further, the present invention is not limited to these embodiments, but variations and modifications may be made without departing from the scope of the present invention.

The present application is based on Japanese Priority Application No. 2005-255455 filed on Sep. 2, 2005, with the Japanese Patent Office, the entire contents of which are hereby incorporated by reference.

What is claimed is:

1. A retaining seal member comprising:
    a sheet material formed of an inorganic fiber;
    wherein the sheet material has a protruding part on one end and a notch part on the other end, the protruding part and the notch part being engageable with each other;
    wherein the protruding part has a corner part that is rounded at a distal end of the protruding part; wherein the notch part has a side part that is rounded at a distal end of the notch part; and
    wherein the protruding part and the notch part are configured to form a space between the protruding part and the notch part when the protruding part and the notch part are engaged with each other.

2. The retaining seal member as claimed in claim 1, wherein the rounded corner part and the rounded side part each have a radius of curvature "R" (mm) satisfying a relationship of approximately $0.5 \leq R \leq P/2$ in a case where "P" is the shorter one of the length "L" of the protruding part and the width "W" of the protruding part when L≠W;
    wherein the rounded corner part and the rounded side part each have a radius of curvature "R" (mm) satisfying a relationship of approximately $0.5 \leq R < P/2$ in a case where "P" represents one of the length "L" of the protruding part and the width "W" of the protruding part when L=W.

3. The retaining seal member as claimed in claim 1, wherein the retaining seal member is configured to be fixed to an exhaust gas process member by wrapping the sheet material around an outer periphery of the exhaust gas process member and engaging the ends of the sheet material.

4. The retaining seal member as claimed in claim 1, wherein a stem part and a base part included in the protruding part each have a radius of curvature "R" (mm) satisfying a relationship of approximately $0.5 \leq R \leq P/2$ in a case where "P" is the shorter one of the length "L" of the protruding part and the width "W" of the protruding part when L≠W;
    wherein the stem part and the base part included in the protruding part each have a radius of curvature "R" (mm) satisfying a relationship of approximately $0.5 \leq R \leq P/2$ in a case where "P" represents one of the length "L" of the protruding part and the width "W" of the protruding part when L=W.

5. The retaining seal member as claimed in claim 2, wherein the radius of curvature "R" (mm) satisfies a relationship approximately of $0.5 \leq = R \leq P/3$.

6. The retaining seal member as claimed in claim 1, wherein the sheet material includes a layered sheet of an inorganic fiber subjected to a needling process.

7. The retaining seal member as claimed in claim 1, wherein the sheet material contains a binder.

8. The retaining seal member as claimed in claim 1, wherein the average diameter of the inorganic fiber is approximately 6 μm or more.

9. The retaining seal member as claimed in claim 1, wherein the inorganic fiber includes a mixture of alumina and silica.

10. The retaining seal member as claimed in claim 3, wherein the exhaust gas process member includes at least one of a catalyst carrier and an exhaust gas filter.

11. The retaining seal member of claim 1, wherein the rounded corner part and the rounded side part each have a radius of curvature "R" (mm) satisfying the relationship of 0.5 mm≦R<5 mm.

12. An exhaust gas cleaning apparatus comprising:
an exhaust gas process member;
a retaining seal member being wrapped around the outer periphery of the exhaust gas process member, the retaining seal member including a sheet material formed of an inorganic fiber; and
a shell that houses the exhaust gas process member and the retaining seal member therein;
wherein the sheet material has a protruding part on one end and a notch part on the other end, the protruding part and the notch part being engageable with each other;
wherein the protruding part has a corner part that is rounded at a distal end of the protruding part;
wherein the notch part has a side part that is rounded at a distal end of the notch part; and
wherein the protruding part and the notch part are configured to form a space between the protruding part and the notch part when the protruding part and the notch part are engaged with each other.

13. The exhaust gas cleaning apparatus as claimed in claim 12, wherein the rounded corner part and the rounded side part each have a radius of curvature "R" (mm) satisfying a relationship of approximately 0.5≦R≦P/2 in a case where "P" is the shorter one of the length "L" of the protruding part and the width "W" of the protruding part when L≠W;
wherein the rounded corner part and the rounded side part each have a radius of curvature "R" (mm) satisfying a relationship of approximately 0.5≦R<P/2 in a case where "P" represents one of the length "L" of the protruding part and the width "W" of the protruding part when L=W.

14. The exhaust gas cleaning apparatus as claimed in claim 12, wherein a stem part and a base part included in the protruding part each have a radius of curvature "R" (mm) satisfying a relationship of approximately 0.5≦R≦P/2 in a case where "P" is the shorter one of the length "L" of the protruding part and the width "W" of the protruding part when L≠W;
wherein the stem part and the base part included in the protruding part each have a radius of curvature "R" (mm) satisfying a relationship of approximately 0.5≦R<P/2 in a case where "P" represents one of the length "L" of the protruding part and the width "W" of the protruding part when L=W.

15. The exhaust gas cleaning apparatus as claimed in claim 13, wherein the radius of curvature "R" (mm) satisfies a relationship of approximately 0.5≦=R≦P/3.

16. The exhaust gas cleaning apparatus as claimed in claim 12, wherein the sheet material includes a layered sheet of an inorganic fiber subjected to a needling process.

17. The exhaust gas cleaning apparatus as claimed in claim 12, wherein the sheet material contains a binder.

18. The exhaust gas cleaning apparatus as claimed in claim 12, wherein the average diameter of the inorganic fiber is approximately 6 μm or more.

19. The exhaust gas cleaning apparatus as claimed in claim 12, wherein the inorganic fiber includes a mixture of alumina and silica.

20. The exhaust gas cleaning apparatus as claimed in claim 12, wherein the exhaust gas process member includes at least one of a catalyst carrier and an exhaust gas filter.

21. The retaining seal member of claim 12, wherein the rounded corner part and the rounded side part each have a radius of curvature "R" (mm) satisfying the relationship of 0.5 mm≦R<5 mm.

* * * * *